United States Patent [19]

Nakamura et al.

[11] Patent Number: 5,225,258

[45] Date of Patent: Jul. 6, 1993

[54] RUBBER COMPOSITION FOR HOLLOW CORE OF PRESSURELESS TENNIS BALL

[75] Inventors: Yoshinobu Nakamura, Nishinomiya; Kuniyasu Horiuchi, Kobe, both of Japan

[73] Assignee: Sumitomo Rubber Industries, Ltd., Kobe, Japan

[21] Appl. No.: 690,216

[22] Filed: Apr. 24, 1991

[30] Foreign Application Priority Data

Apr. 25, 1990 [JP] Japan .................. 2-109179

[51] Int. Cl.$^5$ .................. A63B 39/06; C08L 7/00; C08L 9/00

[52] U.S. Cl. .................. 428/36.8; 273/61 C; 273/61 R; 524/908; 525/232; 525/236; 525/237; 526/340.4

[58] Field of Search .................. 525/236, 237, 232; 273/61 C; 260/988.14; 428/35; 524/908; 526/340.4

[56] References Cited

U.S. PATENT DOCUMENTS 4,533,711  8/1985  Takeuchi et al. ............. 526/164 X
4,580,781  4/1986  Horiuchi et al. .

FOREIGN PATENT DOCUMENTS 2002639  2/1979  Japan .

OTHER PUBLICATIONS

Seymour et al, Polymer Chemistry, Marcel Dekker, Inc., N.Y. 95, 97 (1988).

Database WPIL, ascession No. 86-240892, Derwent Publications, Ltd., London, GB & JP-A-61 168 377 (Sumitomo Rubber) Jul. 30, 1986.

*Primary Examiner*—Fred Teskin
*Attorney, Agent, or Firm*—Nikaido, Marmelstein, Murray & Oram

[57] ABSTRACT

A rubber composition suitable for producing hollow cores of pressureless tennis balls and superior in rebound properties and feeling of striking balls by racket, which contains, as a rubber component, 30 to 100% by weight of a polybutadiene rubber having a content of cis-1,4 bond of at least 97% by weight and a Z-average molecular weight of $5 \times 10^6$ to $2 \times 10^7$ and 70 to 0% by weight of other diene rubbers.

8 Claims, No Drawings

RUBBER COMPOSITION FOR HOLLOW CORE OF PRESSURELESS TENNIS BALL

BACKGROUND OF THE INVENTION

The present invention relates to a rubber composition suitable for a hollow core of a pressureless tennis ball, and more particularly to the rubber composition which contains a specified polybutadiene having a high cis content as a rubber component.

In rubber compositions for producing a hollow core of tennis balls, natural rubber has been generally used as the rubber component. The reason is that natural rubber has a good processability and moreover the cured product is superior in strength.

Two types of tennis balls are known, one being pressurized tennis balls wherein the hollow core is pressurized by means of air or a certain kind of gas to about 0.6–1.2 kg/cm$^2$ higher pressure than atmospheric pressure, and the other being pressureless tennis balls wherein the internal pressure of the hollow core is approximately equal to atmospheric pressure, for example, the excess pressure being 0 or up to 0.4 kg/cm$^2$.

The pressurized tennis balls have a good rebound properties and a good feeling of striking balls by a racket, since the pressure of air or the gas in the core contributes to improvements in rebound properties of the balls and feeling of striking the balls. However, air or the gas of super-atmospheric pressure contained in the core gradually diffuses out through the core wall owing to a pressure difference between the inside and outside of the core and the internal pressure decreases in several months. Consequently, the rebound properties of the balls are reduced, thus the flight of the balls is reduced and the balls are no longer satisfactorily used. It is accordingly necessary for the pressurized tennis balls to be used within a certain specified term after the manufacture, or to be kept in pressurized containers prior to use for preventing the decrease of the internal pressure. However, these procedures are inconvenient and expensive.

On the other hand, the pressureless tennis balls have no problem of the lowering in ball properties resulting from the decrease of the pressure in the core as encountered in pressurized tennis balls. However, the rebound properties, feeling of striking and the like of the pressureless tennis balls must rely on the rebound properties of the rubber composition itself which constitutes the core, because there is no contribution of the pressure in the core to the rebound properties and striking feeling of the balls. Accordingly, it is attempted to improve these properties by making the core wall thick so as to approach the rebound properties and striking feeling of pressurized tennis balls.

However, the improvements in rebound properties and the feeling of striking of the balls by only the increase of the core thickness has a limit. Also, it is impossible to increase the core thickness over a certain level from the viewpoint of the weight of balls. For these reasons, in order to obtain the rebound properties and the feeling of striking which are close to those of pressurized tennis balls, the core rubber composition itself must be improved.

The improvement of the core rubber composition may be achieved by examining fillers to be incorporated therein. However, since the pressureless tennis balls are produced so that the core wall has an increased thickness as compared with pressurized tennis balls, the specific gravity of the core must be reduced by that proportion, and accordingly since the amount of the fillers to be added is restricted, it is difficult to improve the core rubber composition by only the fillers.

It is an object of the present invention to provide a rubber composition which is suitable for producing a hollow core of a pressureless tennis ball and which can provide a pressureless tennis ball having improved rebound properties and good feeling of striking.

The above and other objects of the present invention will become apparent from the description hereinafter.

SUMMARY OF THE INVENTION

Polybutadiene rubbers are in general superior in impact resilience, and among them, those having a high content of cis-1,4 bond called high cis polybutadiene are particularly superior in impact resilience. It has been found that such polybutadiene rubbers, particularly a cis-1,4-polybutadiene having a cis-1,4 bond content of at least 97% by weight and a Z-average molecular weight of $5 \times 10^6$ to $2 \times 10^7$, are very suitable as a rubber component of the composition for producing the hollow core of pressureless tennis balls, and that the rebound properties and the feeling of striking of pressureless tennis balls can be improved by the use thereof.

In accordance with the present invention, there is provided a rubber composition for a hollow core of a pressureless tennis ball which comprises a rubber component consisting of (A) 30 to 100% by weight of polybutadiene having a cis-1,4 bond content of at least 97% by weight and a Z-average molecular weight of $5 \times 10^6$ to $2 \times 10^7$ and (B) 70 to 0% by weight of a diene rubber.

Pressureless tennis balls comprising a hollow spherical core made from the above-mentioned composition and having an internal pressure substantially equal to atmospheric pressure or an internal pressure of up to 0.4 kg/cm$^2$ above atmospheric pressure, and a cover for covering the core, e.g. a textile or felt cover, have excellent rebound properties and feeling of striking.

DETAILED DESCRIPTION

It is necessary that the cis-1,4-polybutadiene having a cis-1,4 bond content of at least 97% by weight used in the present invention has a Z-average molecular weight of $5 \times 10^6$ to $2 \times 10^7$. The Z-average molecular weight is a molecular weight which attaches importance to molecules having a high molecular weight. In the present invention, the Z-average molecular weight is specified to at least $5 \times 10^6$ so that polymer molecules having a high molecular weight are included in large quantities, thereby improving the rebound properties and striking feeling of pressureless tennis balls. The larger the Z-average molecular weight, the higher the impact resilience of polybutadiene. However, the viscosity increases with increasing the Z-average molecular weight, thus the processability is lowered and the practicability becomes poor. Accordingly, in the present invention, it is important to use the cis-1,4-polybutadiene having a Z-average molecular weight of at most $2 \times 10^7$ from the practical point of view.

The polybutadiene having a cis-1,4 bond content of at least 97% by weight and a Z-average molecular weight of $5 \times 10^6$ to $2 \times 10^7$ can be produced by a known method, for example, by a polymerization using lanthanum series rare earth element compounds as the catalyst. It is also commercially available.

Various methods are known for determination of the cis-1,4 bond of polybutadienes. In general, it has been determined by a MORERO method from $^{13}$C-NMR spectrum or infrared absorption spectrum (IR spectrum). Accordingly, in the present invention, the content of cis-1,4 bond is also determined by the MORERO method from IR spectrum.

The Z-average molecular weight of rubbers has been generally determined by gel permeation chromatography (GPC), and the determination by GPC is also adopted in the present invention.

The cis-1,4-polybutadiene defined above may be used alone as the rubber component of the core rubber composition of the present invention, or may be used in combination with other diene rubbers in order to improve the processability. Representative examples of the diene rubbers used together with the cis-1,4-polybutadiene are, for instance, natural rubber, isoprene rubber (IR), styrene-butadiene rubber (SBR), and mixtures thereof.

When the cis-1,4-polybutadiene is used in combination with other diene rubbers as the rubber component of the core rubber composition, it is necessary to use the cis-1,4-polybutadiene in an amount of not less than 30% by weight based on the rubber component. When the content of the cis-1,4-polybutadiene in the rubber component is less than 30% by weight, the effects of improving the rebound properties and the feeling of striking of the pressureless tennis balls are not sufficiently exhibited. Within the range of not less than 30% by weight for the cis-1,4-polybutadiene, the proportion between the cis-1,4-polybutadiene and the diene rubber is suitably determined in accordance with the properties required for the balls. Preferably, the content of the cis-1,4-polybutadiene in the rubber component is from 30 to 80% by weight.

The rubber composition for hollow cores of pressureless tennis balls according to the present invention may contain additives, in addition to the rubber component, e.g. sulfur or an organic sulfur curing agent, one or more of curing accelerators such as a thiazole compound, a sulfenamide compound, a guanidine compound and other known curing accelerators; zinc oxide and stearic acid which are used as activators; an inorganic or organic filler such as basic magnesium carbonate, hard clay, clays, precipitated calcium carbonate, cellulose powder, white carbon (silica) or wood flour. Since the wall thickness of the core of pressureless tennis balls is made thicker than pressurized tennis balls, it is preferable that the fillers used are those having a low specific gravity. Also, in order to impart a hardness to the core, a high styrene resin (styrene-butadiene copolymer having a high styrene content, for example, a styrene content of at least 50% by weight may be added, especially 80 to 85% by weight).

In an example of a fundamental composition for the hollow core, the composition contains, based on 100 parts by weight of the rubber component, 20 to 70 parts by weight of a filler, 1 to 15 parts by weight of zinc oxide, 0.5 to 2 parts by weight of stearic acid, 2 to 5 parts by weight of sulfur or an organic sulfur curing agent and 1 to 10 parts by weight of a curing accelerator. When it is desired to increase the hardness, a high styrene resin may be further added to the composition in an amount of about 1 to about 20 parts by weight per 100 parts by weight of the rubber component.

The thickness of the core wall is usually selected from 4.0 to 5.0 mm which is substantially equal to that of the core of conventional pressureless tennis balls.

Kneading for preparing the core rubber composition according to the present invention, formation of the ball cores from the rubber composition and formation of pressureless tennis balls from the balls cores can be made by conventional procedures. For example, the core rubber composition is prepared by mixing a rubber with additives other than the curing agent such as sulfur or an organic sulfur compound and the curing accelerator by means of a suitable mixing machine such as a Banbury mixer, adding the curing agent and the curing accelerator to the mixture on rolls and further mixing them. The ball core is prepared from the composition, for example, by forming the prepared rubber composition into a sheet, extruding it into a rod form by an extruder, placing the cut rod in a mold for producing half-shells, compression-molding it in the mold to produce half-shells, joining a pair of half-shells so as to form a hollow sphere and compression-molding the shells in a mold to give a ball core. The ball core is then formed into a tennis ball, for example, by covering the core with a felt or textile cover such as a melton cover, and compression-molding the covered core in a mold for ball.

The pressureless tennis balls prepared from the core rubber composition of the invention have excellent rebound properties and produce a satisfactory feeling like pressurized tennis balls when struck by a racket.

The present invention is more specifically described and explained by means of the following Examples, in which all % and parts are by weight unless otherwise noted.

EXAMPLES 1 TO 7 AND COMPARATIVE EXAMPLES 1 TO 7

The number average molecular weight, weight average molecular weight and Z-average molecular weight which were determined by GPC, and the microstructure of the polybutadienes used in the Examples and the Comparative Examples are shown in Table 1.

TABLE 1

| Polybutadiene | Microstructure (%) | | | Average molecular weight | | |
|---|---|---|---|---|---|---|
| | Cis-1,4 bond | Trans-1,4 bond | Vinyl bond | Number average M.W. ($\times 10^4$) | Weight average M.W. ($\times 10^4$) | Z-average M.W. ($\times 10^6$) |
| A | 98.5 | 1.2 | 0.3 | 27.4 | 71.3 | 14.39 |
| B | 98.1 | 1.3 | 0.6 | 22.6 | 90.2 | 5.14 |
| C | 97.2 | 1.9 | 0.9 | 16.0 | 83.0 | 9.32 |
| D | 98.2 | 0.9 | 0.9 | 22.0 | 50.6 | 2.93 |
| E | 97.6 | 1.7 | 0.8 | 16.0 | 58.4 | 4.92 |
| F | 95.8 | 2.4 | 1.8 | 12.3 | 63.0 | 6.53 |
| G | 87.7 | 0.9 | 11.4 | 12.6 | 53.2 | 1.71 |

Polybutadienes A to G shown in Table 1 are those commercially available as shown below. A: Polybutadiene rubber made by BAYER AG using a lanthanum series rare earth element compound catalyst B: Polybutadiene rubber made by EniChem Elastomers Ltd. using a lanthanum series rare earth element compound catalyst C: Polybutadiene rubber made by Japan Synthetic Rubber Co., Ltd. using a nickel catalyst D: Polybutadiene rubber made by Ube Industries, Ltd. using a cobalt catalyst E: Polybutadiene rubber made by Japan Synthetic Rubber Co., Ltd. using a nickel catalyst F: Polybutadiene rubber made by Japan Synthetic Rubber Co., Ltd. using a nickel catalyst G: Polybutadiene rubber made by Ube Industries, Ltd. using a cobalt-lithium catalyst Rubber compositions for hollow cores were prepared according to the recipes shown in Table 2 using the above-mentioned various polybutadiene rubbers by kneading a rubber and additives other than sulfur and a curing accelerator in a Banbury mixer, and then kneading the mixture with sulfur and the accelerator on rolls. In Table 2, accelerator DPG is diphenylguanidine, and accelerator DM is dibenzothiazyl disulfide.

Hollow cores were prepared from the obtained rubber compositions and pressureless tennis balls were prepared by covering the cores with a melton cover according to procedures conventionally adopted to the manufacturing of pressureless tennis balls. That is to say, the rubber compositions were formed into sheets, extruded by an extruder in a rod form, placed in molds for forming half-shells, and compression-molded at 160° C. for 2 minutes to produce half-shells. A pair of the half-shells were joined so as to form a hollow sphere and compression-molded at 150° C. for 2 minutes in a mold to produce a core. The thus obtained cores were covered with a melton cover and subjected to compression molding at 150° C. for 20 minutes in a mold for ball to produce pressureless tennis balls.

The results of measurement of physical properties and feeling of striking of the obtained pressureless tennis balls are shown in Table 3.

A low pressure tennis ball (Example 7) which falls within the category of pressureless tennis ball was also prepared in the same manner as above except that the core was prepared from the same rubber composition as used in Example 6, and when joining half-shells to form a hollow sphere, a blowing agent (sodium nitrite-ammonium chloride-water blowing agent) was introduced into the inner space to give an internal pressure of 0.3 kg/cm$^2$ above atmospheric pressure. The results are also shown in Table 3.

In Table 3, the tennis ball of Comparative Example 6 is a pressureless tennis ball commercially available under the trade mark "Fifteen Love" from Sumitomo Rubber Industries, Ltd. The tennis ball of Comparative Example 7 is a pressurized tennis ball commercially available under the trade mark "DUNLOP FORT" from Sumitomo Rubber Industries, Ltd.

The thicknesses of the cores of the respective balls are 4.4 mm for the pressureless tennis balls of Examples 1 to 6 and Comparative Examples 1 to 6, 4.2 mm for the low pressure tennis ball of Example 7, and 3.5 mm for the pressurized tennis ball of Comparative Example 7.

The measurement of the properties shown in Table 3 was made as follows:

Forward Deformation (mm)

A tennis ball was subsequently compressed about 2.54 cm in three directions at right angles to each other. This procedure was repeated 3 times. That is to say, the ball was compressed 9 times total. In 2 hours after the above preliminary compression, the deformation was measured by a Stevens compression tester in the following manner.

The ball was compressed with an initial load of 3.5 pounds (1.575 kg) and the deformation was measured, and the ball was then compressed with a load of 18 pounds (8.165 kg) and the deformation was measured. The forward deformation is expressed by the difference (mm) between the deformation by a load of 3.5 pounds and the deformation by a load of 18 pounds.

Return Deformation (mm)

After measuring the deformation in the above forward deformation test, the ball was further compressed up to a deformation of 2.54 cm. Then the compression was reduced to a load of 18 pounds (8.165 kg), and the deformation was measured.

Rebound (cm)

A tennis ball was dropped from a height of 100 inches (254 cm) onto a concrete base, and the bound of the ball (height from the concrete base to the bottom of the ball) was measured. The measurement was repeated 3 times and the average was obtained.

TABLE 2

| | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 | Com. Ex. 5 |
|---|---|---|---|---|---|---|---|---|---|---|---|
| Polybutadiene A | — | 80 | 67 | 33 | — | — | — | — | — | — | — |
| Polybutadiene B | — | — | — | — | 80 | — | — | — | — | — | — |
| Polybutadiene C | 100 | — | — | — | — | 80 | — | — | — | — | — |
| Natural rubber | — | 20 | 33 | 67 | 20 | 20 | 100 | 20 | 20 | 20 | 20 |
| Polybutadiene D | — | — | — | — | — | — | — | 80 | — | — | — |
| Polybutadiene E | — | — | — | — | — | — | — | — | 80 | — | — |
| Polybutadiene F | — | — | — | — | — | — | — | — | — | 80 | — |
| Polybutadiene G | — | — | — | — | — | — | — | — | — | — | 80 |
| High styrene resin | 10 | 10 | 10 | 10 | 10 | 10 | 10 | 10 | 10 | 10 | 10 |
| Zinc oxide | 3 | 3 | 3 | 3 | 3 | 3 | 3 | 3 | 3 | 3 | 3 |
| Silica | 5 | 5 | 5 | 5 | 5 | 5 | 5 | 5 | 5 | 5 | 5 |
| Wood flour | 20 | 20 | 20 | 20 | 20 | 20 | 20 | 20 | 20 | 20 | 20 |
| Stearic acid | 1 | 1 | 1 | 1 | 1 | 1 | 1 | 1 | 1 | 1 | 1 |
| Sulfur | 3.5 | 3.5 | 3.5 | 3.5 | 3.5 | 3.5 | 3.5 | 3.5 | 3.5 | 3.5 | 3.5 |
| Accelerator DPG | 2 | 2 | 2 | 2 | 2 | 2 | 2 | 2 | 2 | 2 | 2 |
| Accelerator DM | 1.5 | 1.5 | 1.5 | 1.5 | 1.5 | 1.5 | 1.5 | 1.5 | 1.5 | 1.5 | 1.5 |

(Notes)
High styrene resin: styrene content 85%
Accelerator DPG: diphenylguanidine
Accelerator DM: Dibenzothiazyl disulfide

TABLE 3

| | Weight (g) | Forwarded deformation (mm) | Return deformation (mm) | Rebound (cm) | Feeling of striking |
|---|---|---|---|---|---|
| Ex. 1 | 57.8 | 6.01 | 8.78 | 142.3 | Very light comfortable sound; good and accelerating-like flight |
| Ex. 2 | 57.9 | 5.90 | 8.78 | 144.5 | Same as Ex. 1 |
| Ex. 3 | 57.8 | 6.04 | 8.96 | 142.6 | Same as Ex. 1 |
| Ex. 4 | 57.8 | 6.18 | 9.32 | 140.6 | Slightly inferior to Exs. 1–3; light sound; good flight |
| Ex. 5 | 57.8 | 6.08 | 8.97 | 142.8 | Very light comfortable sound; good flight |
| Ex. 6 | 57.7 | 6.12 | 9.03 | 141.6 | Light comfortable sound; good flight |
| Ex. 7 | 58.0 | 5.90 | 8.45 | 142.7 | Same as Ex. 6 |
| Com. Ex. 1 | 58.0 | 6.32 | 9.33 | 136.0 | Soft feeling; heavy sound; poor and depressed flight |
| Com. Ex. 2 | 57.8 | 6.13 | 9.14 | 139.0 | Not soft, but sound being slightly thick; poor and depressed flight |
| Com. Ex. 3 | 57.9 | 6.25 | 9.27 | 138.0 | Same as Com. Ex. 2 |
| Com. Ex. 4 | 57.8 | 6.17 | 9.23 | 137.2 | Same as Com. Ex. 2 |
| Com. Ex. 5 | 57.8 | 5.72 | 8.68 | 136.1 | Hard feeling; poor and depressed flight |
| Com. Ex. 6 | 67.5 | 5.60 | 8.50 | 137.0 | Heavy feeling; poor and depressed flight |
| Com. Ex. 7 | 57.9 | 6.70 | 8.95 | 143.4 | Light feeling; good and accelerating-like flight |

As shown in Tables 1 to 3, the tennis balls of Examples 1 to 7 wherein butadiene rubbers having a cis-1,4 bond content of at least 97% by weight and a Z-average molecular weight of at least $5 \times 10^6$ are used as a rubber component have a higher rebound and a better feeling of striking than the tennis balls of Comparative Example 1 using only natural rubber as a rubber component, and also have rebound property and a feeling of striking on the same level as those of the commercial pressurized tennis ball of Comparative Example 7.

The tennis balls of Comparative Examples 2 to 5 are also prepared from rubber compositions containing butadiene rubbers as a rubber component, but they are inferior in rebound and feeling of striking to the tennis balls of Examples 1 to 7. The reason is considered to be that in contrast to that polybutadienes A to C used in Examples 1 to 7 have a cis-1,4 bond content of at least 97% by weight and a Z-average molecular weight of at least $5 \times 10^6$, polybutadienes D and E used in Comparative Examples 2 and 3 have a lower Z-average molecular weight, polybutadiene F used in Comparative Example 4 has a lower content of cis-1,4 bond, polybutadiene G used in Comparative Example 5 has a lower content of cis-1,4 bond and a lower Z-average molecular weight.

Estimating the data with respect to the cis-1,4 bond content, polybutadiene F used in Comparative Example 4 has a Z-average molecular weight of $6.53 \times 10^6$ which is higher than $5 \times 10^6$, but the content of cis-1,4 bond is lower than 97% by weight. The tennis ball of Comparative Example 4 is inferior in rebound and feeling of striking to the tennis balls of the Examples. From these results, it is considered that if the content of 1,4-cis bond is lower than 97% by weight, the contents of trans-1,4 bond and vinyl bond increase in proportion to the decrease of the cis-1,4 bond content, and as a result, the polybutadiene does not much contribute to the improvement of rebound properties. The Z-average molecular weight is an average molecular weight which attaches importance to polymer molecules having a high molecular weight. When a polybutadiene having a small Z-average molecular weight such as polybutadienes D and E is used, the rebound is small and the feeling of striking is bad as seen in Comparative Examples 2 and 3. From these results, it is considered that the impact resilience of rubbers depends on the proportion of polymer molecules having a high molecular weight and the use of a polybutadiene containing polymer molecules having a high molecular weight in not much proportion does not much contribute to the improvement of rebound properties.

Table 1 indicates number average molecular weight and weight average molecular weight of polybutadiene rubbers together with the Z-average molecular weight. It is considered that the Z-average molecular weight is the most mutually related to the rebound properties among them.

In addition to the ingredients used in the Examples, other ingredients can be used in the Examples as set forth in the specification to obtain substantially the same results.

What we claim is:

1. A core for a pressureless tennis ball having an internal pressure substantially equal to atmospheric pressure or an internal pressure of up to 0.4 kg/cm² above atmospheric pressure, said core being made from a composition comprising (A) 30 to 100% by weight of a polybutadiene having a cis-1,4 bond content of at least 97% by weight and a Z-average molecular weight of $5 \times 10^6$ to $2 \times 10^7$ and (B) 70 to 0% by weight of a diene rubber.

2. The core as claimed in claim 1 wherein the diene rubber (B) of said composition is at least one member selected from the group consisting of natural rubber, isoprene rubber, and styrene-butadiene rubber.

3. The core as claimed in claim 1 wherein the rubber component of said composition contains 30 to 80% by weight of said polybutadiene (A).

4. The core as claimed in claim 1 wherein said composition additionally comprises 1 to 20 parts by weight, per 100 parts of the total of (A) and (B), of a styrene-butadiene copolymer having a styrene content of at least 50% by weight.

5. A pressureless tennis ball including a hollow spherical core and a cover therefor, said core having an internal pressure substantially equal to atmospheric pressure or an internal pressure of up to 0.4 kg/cm² above atmospheric pressure and being made from a composition comprising (A) 30 to 100% by weight of a polybutadiene having a cis-1,4 bond content of at least 97% by weight and Z-average molecular weight of $5 \times 10^6$ to $2 \times 10^7$ and (B) 70 to 0% by weight of a diene rubber.

6. The pressureless tennis ball as claimed in claim 5 wherein the diene rubber (B) of said composition of said core is at least one member selected from the group consisting of natural rubber, isoprene rubber, and styrene-butadiene rubber.

7. The pressureless tennis ball as claimed in claim 5 wherein the rubber component of said composition of said core contains 30 to 80% by weight of said polybutadiene (A).

8. The pressureless tennis ball as claimed in claim 5 wherein said composition additionally comprises 1 to 20 parts by weight, per 100 parts of the total of (A) and (B), of a styrene-butadiene copolymer having a styrene content of at least 50% by weight.

* * * * *